US012267301B2

(12) United States Patent
Bonczar

(10) Patent No.: US 12,267,301 B2
(45) Date of Patent: Apr. 1, 2025

(54) METHODS AND SYSTEMS FOR AUTOMATICALLY SECURING ENDPOINT DEVICE DATA COMMUNICATIONS

(71) Applicant: David Thomas Bonczar, Squantum, MA (US)

(72) Inventor: David Thomas Bonczar, Squantum, MA (US)

(*) Notice: Subject to any disclaimer, the term of this patent is extended or adjusted under 35 U.S.C. 154(b) by 0 days.

(21) Appl. No.: 16/896,341

(22) Filed: Jun. 9, 2020

(65) Prior Publication Data

US 2021/0021572 A1  Jan. 21, 2021

Related U.S. Application Data

(60) Provisional application No. 62/874,069, filed on Jul. 15, 2019.

(51) Int. Cl.
*H04L 29/00* (2006.01)
*H04L 9/40* (2022.01)
*H04L 12/46* (2006.01)

(52) U.S. Cl.
CPC ...... *H04L 63/0272* (2013.01); *H04L 12/4641* (2013.01); *H04L 63/0245* (2013.01);
(Continued)

(58) Field of Classification Search
CPC .............. H04L 63/0272; H04L 12/4641; H04L 63/0245; H04L 63/0263; H04L 63/1425; H04L 63/20
See application file for complete search history.

(56) References Cited

U.S. PATENT DOCUMENTS

2003/0191848 A1  10/2003  Hesselink
2004/0120295 A1  6/2004  Liu
(Continued)

FOREIGN PATENT DOCUMENTS

| KR | 1020170001655 A | 1/2017 |
| WO | 2007016478 A2 | 2/2007 |
| WO | 2021011114 A1 | 1/2021 |

OTHER PUBLICATIONS

International Search Report and Written Opinion mailed Sep. 17, 2020, in International Patent Application No. PCT/US2020/036587, 8 pages.

*Primary Examiner* — Jeffrey C Pwu
*Assistant Examiner* — Helai Salehi
(74) *Attorney, Agent, or Firm* — Blueshift IP, LLC

(57) ABSTRACT

A method for automatically securing endpoint device data communications includes establishing, between a first server and an endpoint device, a persistent virtual private network (VPN) connection, the endpoint device configured to automatically establish the persistent VPN connection upon establishing network connectivity. The first server provides, for the endpoint device, a network address translation (NAT) firewall service. The first server receives a plurality of data packets from a third computing device. The first server inspects each of the received plurality of data packets. The first server determines whether to block one of the plurality of data packets or to forward the one of the plurality of data packets to the second computing device. The first server blocks the one of the plurality of data packets based upon a determination that the one of the plurality of data packets fails to satisfy a security rule.

5 Claims, 7 Drawing Sheets

(52) U.S. Cl.
CPC ...... *H04L 63/0263* (2013.01); *H04L 63/1425* (2013.01); *H04L 63/20* (2013.01)

(56) References Cited

U.S. PATENT DOCUMENTS

| | | |
|---|---|---|
| 2006/0029062 A1 | 2/2006 | Rao |
| 2006/0174336 A1 | 8/2006 | Chen |
| 2015/0350161 A1 | 12/2015 | Hsu |
| 2018/0375841 A1* | 12/2018 | Tola .................. H04L 63/0464 |
| 2019/0081976 A1 | 3/2019 | Kraft |
| 2019/0149528 A1* | 5/2019 | Schwartz ............ H04W 12/108 713/153 |
| 2019/0166013 A1 | 5/2019 | Shaikh |
| 2019/0182213 A1 | 6/2019 | Saavedra |
| 2022/0045927 A1* | 2/2022 | Liu ........................ H04L 43/10 |

* cited by examiner

METHODS AND SYSTEMS FOR AUTOMATICALLY SECURING ENDPOINT DEVICE DATA COMMUNICATIONS

CROSS-REFERENCE TO RELATED APPLICATIONS

This application claims priority from U.S. Provisional Patent Application No. 62/874,069, filed on Jul. 15, 2019, entitled, "Methods and Systems for Automatically Securing Endpoint Device Data Communications," which is hereby incorporated by reference.

BACKGROUND

The disclosure relates to securing data communications over computer networks. More particularly, the methods and systems described herein relate to functionality for automatically securing endpoint device data communications.

Mobile devices such as mobile phones, tablets, laptops, and other devices that connect to a variety of computer networks (e.g., wired and wireless) in a variety of ways (e.g., via WiFi, Bluetooth, and cellular connections) are more likely to "roam" from one network to another than a conventional desktop or laptop machine that is used in a single environment on a single network (e.g., an employee machine that has an Internet Protocol (IP) address on an employer computer network or a family's personal computer that has an IP address on a home network or assigned by an internet service provider). Conventional devices that may typically only access one network can typically benefit from network security techniques implemented across the network—for example, by a firewall, intrusion detection system, intrusion prevention system, and other security features and policies established and maintained by the network provider. In contrast, mobile devices by their nature roam from one network to another accessing a variety of networks that may or may not provide any security for mobile devices. This is a particular challenge for corporate environments and environments with "bring your own device" policies allowing individuals to use their personal devices in a variety of settings, including a work environment—for example, an employee user may start work at a coffee shop in the morning and join an unsecured network, commute to a client meeting and join a wireless network that requires a password but provides limited other security features (e.g., no firewalls), and then go to a corporate office to work for the rest of the day from a secured network (bringing with them any malicious software they may have unwittingly encountered at other sites). Similarly, families may have concerns regarding students using a free wireless network at school with minimal or no security, a different wireless network at an afterschool activity with minimal or no security, and then a secured home network in the evening.

Therefore, there is a need for methods and systems that address network security for roaming devices.

BRIEF SUMMARY

In one aspect, a method for automatically securing endpoint device data communications includes establishing, between a first server and an endpoint device, a persistent virtual private network connection, the endpoint device configured to automatically establish the persistent virtual private network connection upon establishing network connectivity. The method includes providing, by the first server, for the endpoint device, a network address translation (NAT) firewall service. The method includes receiving, by the first server, a plurality of data packets from a third computing device. The method includes inspecting, by the first server, each of the received plurality of data packets. The method includes determining, by the first server, whether to block one of the plurality of data packets or to forward the one of the plurality of data packets to the second computing device. The method includes blocking, by the first server, the one of the plurality of data packets based upon a determination that the one of the plurality of data packets fails to satisfy a security rule.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
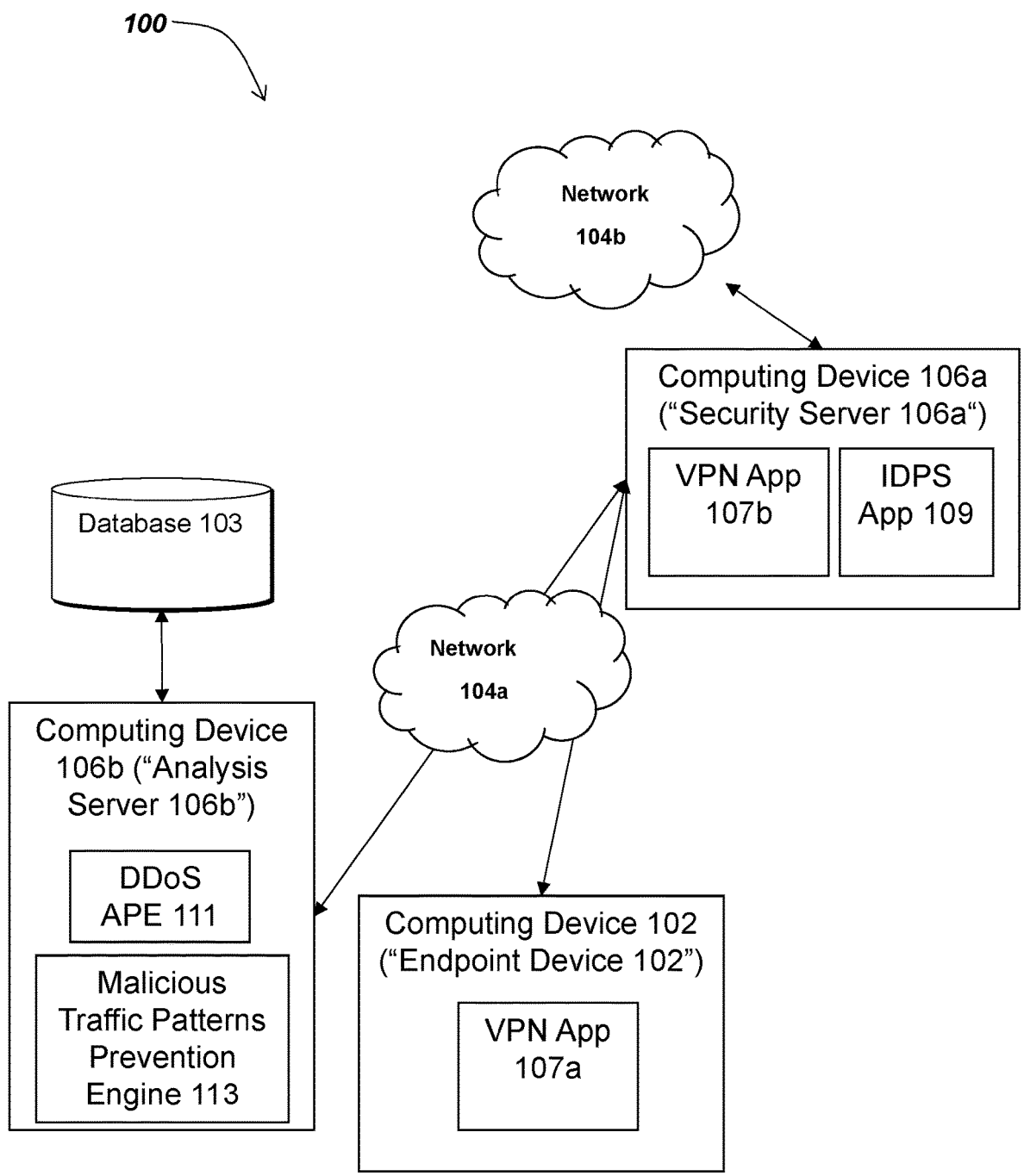
FIG. 1 is a block diagram depicting an embodiment of a system for automatically securing endpoint device data communications.

The present disclosure relates to methods and systems for automatically securing endpoint device data communications. In some embodiments, the methods and systems described herein have endpoint devices automatically establish virtual private network (VPN) connections with a security server as part of connecting to a network (e.g., the endpoint device may be modified to automatically connect first to the security server via a VPN connection, upon receiving a request or instruction to connect to a network). In one of these embodiments, the methods and systems described herein further include modifying the endpoint device such that all network traffic to or from the endpoint device flows through the VPN connection. In such embodiments, by having VPN connections automatically established any time the endpoint device attempts to establish network connectivity, the methods and systems described herein provide functionality for ensuring all network traffic flows through a secured VPN connection to a trusted security server, even when the endpoint device roams from one network to another. Therefore, in some embodiments, execution of the methods and systems described herein may result in the endpoint device automatically establishing a VPN connection each time the endpoint device attempts to connect to a network and the system is able to maintain a persistent connection to the VPN server while the endpoint device is roaming. Furthermore, and in contrast to conventional approaches, in some embodiments, use of the methods and systems described herein allows the endpoint device to connect to a secure connection and maintain the secure connection while roaming, allowing the endpoint device to securely transmit data to a machine on another network even in situations where either the endpoint device or the target machine or both do not have firewalls. Conventional uses of an intermediary server typically support communication between devices that are each behind firewalls but are not conventionally configured to support traffic between devices where one or both endpoint devices are not behind firewalls and do not typically involve having an endpoint device maintain a persistent VPN connection to the intermediary server. Furthermore, in contrast to conventional approaches, and in some embodiments, use of the methods and systems described herein does not require the endpoint device to install or maintain firewalls or kernel drivers in order to maintain a persistent connection while connecting to a network while roaming across a plurality of networks.

Although it is known that remote devices may establish Virtual Private Networks (VPNs) connections to access corporate or other entity resources, it is not known to use those VPN connections on mobile devices for the purposes of connecting a mobile (and likely roaming) device to a secured server that can provide security services for that mobile data and re-establish that connection between the secured server and the mobile device in order to maintain a persistent VPN connection each time the user connects an endpoint device to a network (any network) in order to access unsecured resources on a separate network. This is in contrast to conventional approaches, which typically require that either the mobile device or the network the mobile device is attempting to communicate with, or both, have specialized security software installed on the network to protect the communication. That is, while a corporate VPN can protect communications between an end user device and a corporate resource located on a corporate network (the corporate resource located behind likely sophisticated security protections), such a connection does not protect an endpoint device if the end user makes a connection to a non-corporate resource on a non-corporate network. So, for example, a user accessing a secured network via a VPN connection may access sensitive corporate data securely but may also use a non-VPN connection to access personal hosted electronic mail accounts or social media pages, compromising the endpoint device. And for users of mobile devices who have no corporate resources to access (e.g., children trying to reach a public library's online catalog or a school's homework portal or an individual seeking to access a bank's online portal), there is no secure connection they can establish to a secure network because they do not have the ability to establish a VPN connection to the bank or the school or whatever other resource they seek to access but are not in control of and cannot impose security requirements on. A user may wish to access a bank's online portal but not have the ability to force the bank to provide VPN connections for increased security. However, by establishing a VPN connection to a security server 106a, which can implement a high level of security for a variety of purposes and can monitor traffic coming from outside sources to determine whether the incoming traffic has been compromised (e.g., can tell a user they've been redirected to a site other than the bank's site due to a phishing scam), the methods and systems described herein can provide improvements to the security of the endpoint device.

Referring now to FIG. 1, a block diagram depicts one embodiment of a system 100 for automatically securing endpoint device data communications. The system 100 includes a computing device 102, a database 103, a network 104a, a network 104b, a computing device 106a, an analysis server 106b, a VPN application 107a, a VPN application 107b, an intrusion detection and prevention system (IDPS) 109, Distributed Denial of Service Attack Prevention Engine (DDoS APE) in, and a malicious traffic patterns prevention engine 113.

The computing device 102 may be referred to as an endpoint device 102. The computing device 102 may be provided as a computing device 402, described in greater detail below in connection with FIGS. 4A-4C. The computing device 102 may execute a VPN application 107a that establishes the VPN connection between the computing device 102 and the security server 106a. Establishing the VPN connection may include transmitting, by the VPN application to the security server 106a a username and password assigned to a user of the endpoint device 102. The computing device 102 may include a VPN application 107a. A user of the computing device 102 may install a VPN application 107a on to the computing device. A user of the computing device 102 may configure the VPN application 107a to, for example, enable an option to "send all traffic" in which case the VPN application 107a ensures that the computing device 102 sends all network traffic to the security server 106a. The security server 106a may provide a user of the computing device 102 with instructions for configuring the VPN application 107a, which may be a native VPN previously installed on the computing device 102. In some embodiments, the computing device 102 may receive a username and user password and shared secret password for use with logging into the VPN application 107a and establishing the connection to the security server 106a. For example, an administrator may provide the username and user password and shared secret password. As another example, a web-based, automated system may allow a user of the computing device 102 to register for an account and to receive a message (e.g., via electronic mail, text/Short Message Service, phone call, etc.) providing the username and user password and shared secret password along with initial configuration instructions. Continuing with this example, a machine 106c (not shown) may provide such a web-based automated system and this functionality may be based on systems such as Remote Authentication Dial-In User Service (RADIUS) authentication systems.

Endpoint devices 102 may include smartphones, personal digital assistants, laptops, and other computing devices that users may carry from one physical location to another and that have the ability to connect to a variety of networks in a variety of ways.

Endpoint devices 102 may also include stationary smart devices that are not customizable to increase security—for example, devices that are referred to as "Smart devices" or as part of the "Internet of Things" (IoT) (such as smart thermostats, home security systems, appliances, and other devices) may not roam with the user from one physical location to another but a user may wish to secure the network data communications sent between the device and an external IP address (e.g., between a baby monitor or home security system and a third party service providing reporting and analytics for the user via the public Internet). In some embodiments, an IoT manufacturer may integrate VPN functionality into an IoT device during a manufacturing process. In other embodiments, an intermediate device (such as a wireless router) would establish a VPN connection to the VPN server and, once the connection is established, IoT devices may then connect to the wireless network; if an IoT device needs to access a resource on an external network (e.g., "on the Internet"), the communications between the IoT device and the resource will transit the VPN connection established by the intermediate device.

The computing device 106a may be referred to as a server 106a. The computing device 106a may be referred to as a security server 106a. The security server 106a may be provided as a computing device 406, described in greater detail below in connection with FIGS. 4A-4C.

The security server 106a may execute a VPN application 107b to establish one or more VPN connections with one or more computing devices iota-n. Such a VPN application 107b may be executing in server mode (either because that is the only mode available when installed and configured for use on the security server 106a or because the VPN applications 107 generally include both server-side functionality and client-side functionality and the server-side functionality is enabled when executing on the security server 106a). The security server 106a may include authentication functionality that allows the security server 106a to authenticate a user of an endpoint device 102 upon receiving a request for establishment of a VPN connection from the endpoint device 102 (e.g., from a second VPN application executing on the endpoint device 102).

The security server 106a may include the functionality of a network address translation (NAT) service. The security server 106a may provide NAT functionality and Port Address Translation (PAT) functionality. The security server 106a may provide NAT/PAT functionality so that once a computing device 102 connects to the security server 106a via the VPN application 107, the security server 106a may create a virtual network interface card (VNIC) and assign an RFC-1918 compliant IP address for use between the security server 106a and the computing device 102; once traffic traverse the security server 106a, the security server 106a translates the RFC-1918 IP address via NAT/PAT to a physical IP address of the server. Through the use of PAT, many devices 102 can connect to a single security server 106a; traffic to and from these devices appear to be coming from and going to a single IP address—the IP address of the security server—and PAT uses TCP/UDP ports to differentiate the traffic.

The security server 106a may include the functionality of an intrusion detection and prevention system 109 to inspect data communications in real time. The intrusion detection and prevention system 109 may be a firewall in an "allow by default" state. The intrusion detection and prevention system 109 may be a NAT firewall. The security server 106a may thus inspect traffic and block traffic if the security server 106a determines that the traffic is malicious. For example, when an endpoint device 102 establishes a VPN connection to the security server 106a, the security server 106a uses the intrusion detection and prevention system to act as an inspection point for all data communications leaving the endpoint device 102 and entering the endpoint device 102 via the Internet. In some embodiments, the intrusion detection and prevention system may apply pre-defined rules to determine if one or more data packets should be blocked (e.g., upon determination that a rule indicates the data packet includes malicious data that poses a security threat to the endpoint device 102 and/or the network 104a). The intrusion detection and prevention system 109 may include functionality for generating logs of security decisions and sharing generated logs. Given the large amount of dissimilar traffic that may need to be inspected, in some embodiments, the intrusion detection and prevention system 109 looks for anomalous traffic patterns; if an anomalous traffic pattern is detected, the traffic is blocked. This intrusion detection and prevention system 109, in conjunction with the analysis server 106b, may, therefore, be constantly learning and searching for anomalous traffic and patterns of such traffic.

The security server 106a may include functionality for autonomous data communications policy enforcement. In one embodiment, this functionality provides the blocking function of the intrusion detection and prevention system 109. The autonomous data communications policy enforcement functionality may allow the security 106a to block traffic. As one example, if an individual server 106a detects anomalous traffic, the security server 106a may block the traffic. As another example, if the analysis server 106b detects an aggregate of anomalous traffic from several security servers 106a, the analysis server 106b may create a rule blocking such traffic and send the rule to each security server 106a.

By way of example, the security server 106a may receive or have access to a set of security rules to enforce when determining whether to allow transmission of packets to their destination addresses. As another example, the security server 106a may automatically receive updated third-party lists of cybersecurity threat intelligence rules to ensure the security servers are up to date (e.g., receiving the lists from third-party cybersecurity resources). Cybersecurity threat intelligence rules may include lists of known bad IP addresses, domain names, and uniform resource locators (URLs). These rules may be updated periodically. The cybersecurity threat intelligence rules are loaded into the intrusion detection and prevention system. An automated process executing on the security server 106a may load the rules on to the security server 106a. For example, the security server 106a may execute a process that uses an application programming interface (API) to check for new updates to lists and load any identified updates into the intrusion detection and prevention system 109.

The computing device 106a may include functionality for monitoring traffic transmitted by or addressed to the endpoint device. In one embodiment, the intrusion detection and prevention system 109 provides this functionality. The computing device 106a may include functionality for making security decisions regarding whether one or more inspected data packets (e.g., Internet Protocol (IP) packets) satisfy one or more security rules dictating whether or not to allow the transmission of the packet to its destination address. The computing device 106a may include functionality for logging one or more security decisions. The computing device 106a may include functionality for transmitting logged data to the analysis server 106b. The computing device 106a may include functionality for receiving one or more security rules from the analysis server 106b.

The analysis server 106b may be referred to as a server 106b. The computing device 106a may be referred to as a computing device 106b. The computing device 106b may be provided as a computing device 406, described in greater detail below in connection with FIGS. 4A-4C. The analysis server 106b may provide a central log repository storing one or more logs of security decisions received from one or more security servers 106a. The analysis server 106b may provide endpoint device communication analytics allowing for an analysis of patterns of network traffic transmitted and received by a plurality of endpoint devices across a network 104a. The logs in the central log repository may form the basis for the endpoint device communications analytics.

The analysis server 106b and the security server 106a may each reside on the same network 104a. The network 104a may be provided as a network 404 as described in greater detail below in connection with FIGS. 4A-4C. The security server 106a may assign the computing device 102 a network address on the network 104a.

The database 103 may store a set of security rules. The database 103 may be accessed by the analysis server 106b. The database 104 may be accessed by the security server 106ba. The database 103 may be an ODBC-compliant database. For example, the database 103 may be provided as an ORACLE database, manufactured by Oracle Corporation of Redwood Shores, CA. In other embodiments, the database 103 can be a Microsoft ACCESS database or a Microsoft SQL server database, manufactured by Microsoft Corporation of Redmond, WA. In other embodiments, the database 103 can be a SQLite database distributed by Hwaci of Charlotte, NC, or a PostgreSQL database distributed by The PostgreSQL Global Development Group. In still other embodiments, the database 103 may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), H Base databases distributed by The Apache Software Foundation of Forest Hill, MD, MongoDB databases distributed by ioGen, Inc., of New York, NY, and Cassandra databases distributed by The Apache Software Foundation of Forest Hill, MD. In further embodiments, the database 103 may be any form or type of database.

Although for ease of discussion, only one computing device 102, database 103, computing device 106a, and analysis server 106b are shown in FIG. 1, those of ordinary skill in the art will understand that multiple of any and/or each of these devices may be provided. Similarly, although the analysis server 106b and the computing device 106a are described as separate devices, it should be understood that this does not restrict the architecture to that particular implementation. For instance, these components may be encompassed by a single circuit or software function or, alternatively, distributed across a plurality of computing devices. In some embodiments, as another example, an analysis server 106b may also provide the functionality of the security server 106a, and vice versa, while in other embodiments, the functionality is on separate devices, as shown in FIG. 1.

Figure 2A:
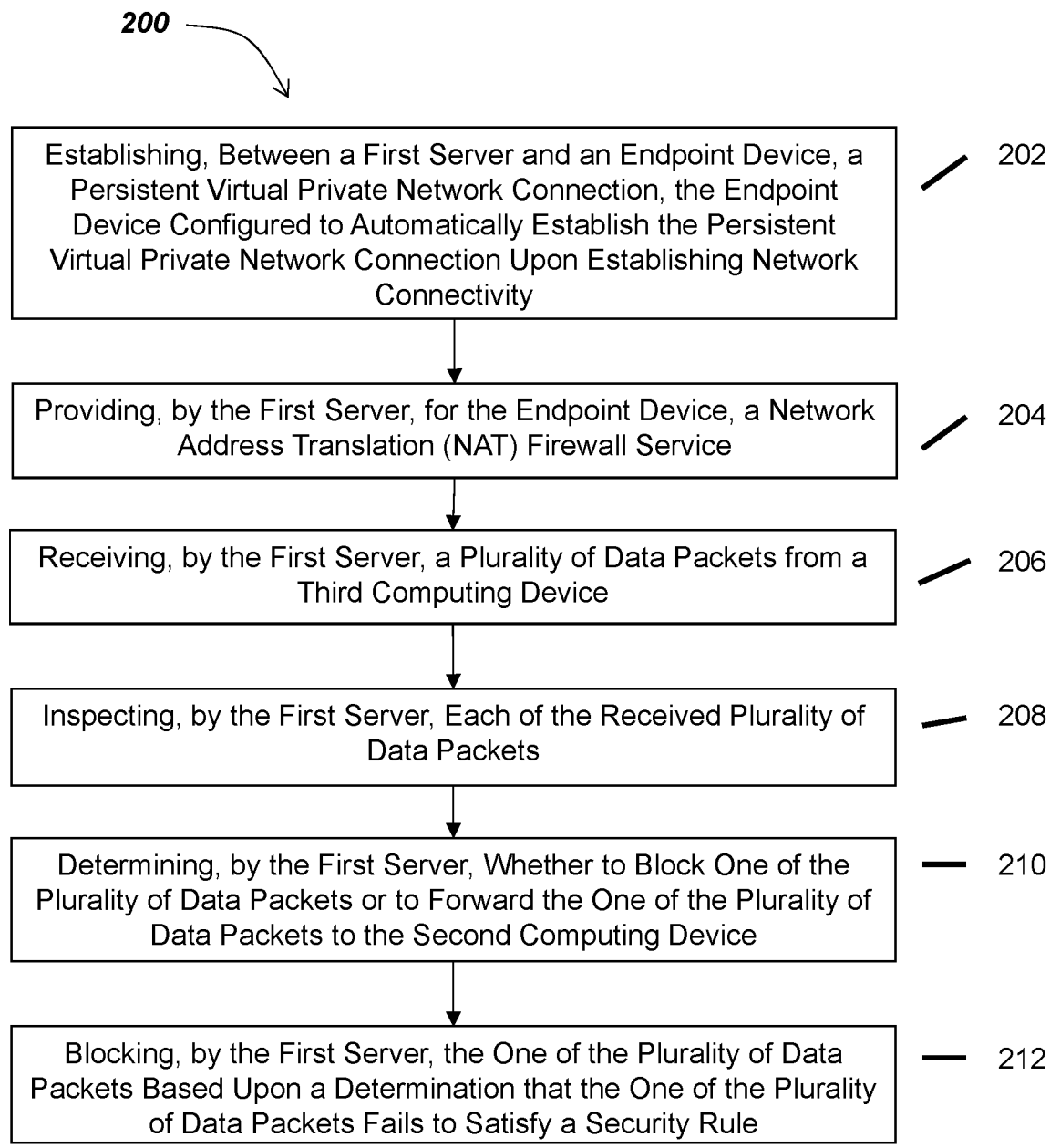
FIG. 2A is a flow diagram depicting an embodiment of a method for automatically securing endpoint device data communications.

Referring now to FIG. 2A, a flow diagram depicts one embodiment of a method 200 for automatically securing endpoint device data communications. In brief overview, the method 200 includes establishing, between a first server and an endpoint device, a persistent virtual private network (VPN) connection, the endpoint device configured to automatically establish the persistent VPN connection upon establishing network connectivity (202). The method 200 includes providing, by the first server, for the endpoint device, a network address translation (NAT) firewall service (204). The method 200 includes receiving, by the first server, a plurality of data packets from a third computing device (206). The method 200 includes inspecting, by the first server, each of the received plurality of data packets (208). The method 200 includes determining, by the first server, whether to block one of the plurality of data packets or to forward the one of the plurality of data packets to the second computing device (210). The method 200 includes blocking, by the first server, the one of the plurality of data packets based upon a determination that the one of the plurality of data packets fails to satisfy a security rule (212).

Referring now to FIG. 2A, in greater detail and in connection with FIG. 1, the method 200 includes establishing, between a first server and an endpoint device, a persistent virtual private network (VPN) connection, the endpoint device configured to automatically establish the persistent VPN connection upon establishing network connectivity (202). The VPN connection may be considered a data communication overlay platform between the endpoint device 102 and the security server 106a, regardless of a type of network connection between the endpoint device 102 and the security server 106a. The VPN connection is used to securely send and receive all data communications from the endpoint device 102 and the security server 106a for inspection by the security server 106a. By leveraging VPN technology as an overlay technology, an end device may securely connect to the security servers regarding of connection type (cellular, wireless, wired); this proactive approach to security may mitigate potential risks to the end devices by having a persistent and secure connection to the security servers that can provide packet inspection and intrusion detection and prevention services.

In some embodiments, to ensure that the endpoint device 102 establishes a VPN connection before beginning to transmit or receive network data for other purposes, the method includes modifying a network connection setting of the endpoint device 102. For example, the modification may require a network adapter of the endpoint device 102 to establish the VPN connection to the first server in order to receive network connectivity. As another example, the modification may require configuring a VPN application built into the endpoint device 102 to enable an "always on" feature and provide credentials and address information for connecting to the security server 106a. In some embodiments, the endpoint device 102 is configured to transmit a ping message to the security server 106a periodically as a way to maintain the VPN connection.

In some embodiments, the method includes modifying a network connection setting of the endpoint device, the modification requiring all network traffic to flow through the VPN connection. As an example, the modification may include modifying a routing table of the endpoint device to force all network traffic to flow through the VPN connection.

The method 200 includes providing, by the first server, for the endpoint device, a network address translation (NAT) firewall service (204). The security server 106a may implement practices outlined in the Internet Engineering Task Force document RFC 1918 regarding Address Allocation for Private Internets to provide address translation services. As will be understood by those of ordinary skill in the art, by rewriting a TCP/IP packet generated by the endpoint device 102 so that the source IP address is an address on the network 104a (and, in some embodiments, is the public IP address of the security server 106a), the security server 106a ensures that the security server 106a will receive any packets sent in response; in this way, the security server 106a can ensure that the security server 106a will be able to inspect packets returning to the endpoint device 102. The security server 106a may optionally take note of the address to which the endpoint device 102's packet is addressed so that when a packet is received having that noted address, the security server 106a can look up which endpoint device 102 (and which endpoint device 102's communications flow) the incoming packet is associated with. As will also be understood by those of ordinary skill in the art, private networks may be nested within other private networks—for example, although not shown in FIG. 1, the network 104a may be a first private network hosting a plurality of security servers 106a and a plurality of analysis servers 106b and providing private addresses to a plurality of endpoint devices 102 but the network 104a may itself be a private network within a second private network (such as in embodiments in which administrators of the network 104a contract with a network service provider that leases or otherwise makes available network services and address space).

The method 200 includes receiving, by the first server, a plurality of data packets from a third computing device (206). As indicated above, the security server 106a may have performed NAT translation services on outbound packet data and so the security server 106a will be the addressee of the inbound packet data intended to respond to the outbound packet data, and, therefore, will receive the incoming plurality of data packets from the third computing device (e.g., a device on the network 104b which may be the public Internet).

The method 200 includes inspecting, by the first server, each of the received plurality of data packets (208). In one embodiment, the security server 106a inspects all data communications leaving the end device 102 and all data entering the end device 102, in real-time. Based on the results of the inspection, the security server 106a either allows or blocks the transmission of data communication. In some embodiments, the intrusion detection and prevention system 109 inspects each of the received plurality of data packets. The security server 106a may inspect the packet to determine whether the packet is part of a port scan. The security server 106a may inspect the packet to determine whether the packet forms part of a known pattern of attack, based on using the one or more security rules in the rule set (e.g., the rule set of the intrusion detection and prevention system 109).

The method 200 includes determining, by the first server, whether to block one of the plurality of data packets or to forward the one of the plurality of data packets to the second computing device (210). The security server 106a may use the one or more rules to determine whether to block the data packets.

The method 200 includes blocking, by the first server, the one of the plurality of data packets based upon a determination that the one of the plurality of data packets fails to satisfy a security rule (212).

In some embodiments, a device may be profiled by capturing and analyzing traffic patterns of the device. For example, the device may be a mobile communications device such as those produced by Apple, Inc., of Cupertino, CA, such as an IPHONE device and the device may communicate with an APPLE update server—but not with an ANDROID update server provided by Google, LLC, of Mountain View, CA. Capturing and analyzing this type of data may result in generation of device profiles that may be applicable to a plurality of devices (e.g., more than one IPHONE). Therefore, the methods and systems described herein may provide functionality for generating, by the first server, a device fingerprint (e.g., profiling the device itself as well as, optionally, one or more applications installed on the device), analyzing the device fingerprint and at least one of the plurality of data packets, and using device fingerprints to determine whether or not to block the network traffic (e.g., the plurality of data packets) intended for the endpoint device. As will be understood by those of skill in the art, fingerprinting a device may include analyzing traffic patterns (e.g., destination IP address, TCP/UDP ports and metadata higher in the OSI layer); the process may include data mining and applying automated and intelligent (e.g., artificial intelligence) controls to generate a profile or fingerprint for use in safeguarding an end user device. The first server may use a device fingerprint generated based on a first device as representative of a first type of device and use the device fingerprint generated based on the first device in determining whether or not to block the network traffic intended for a second endpoint device.

Figure 2B:
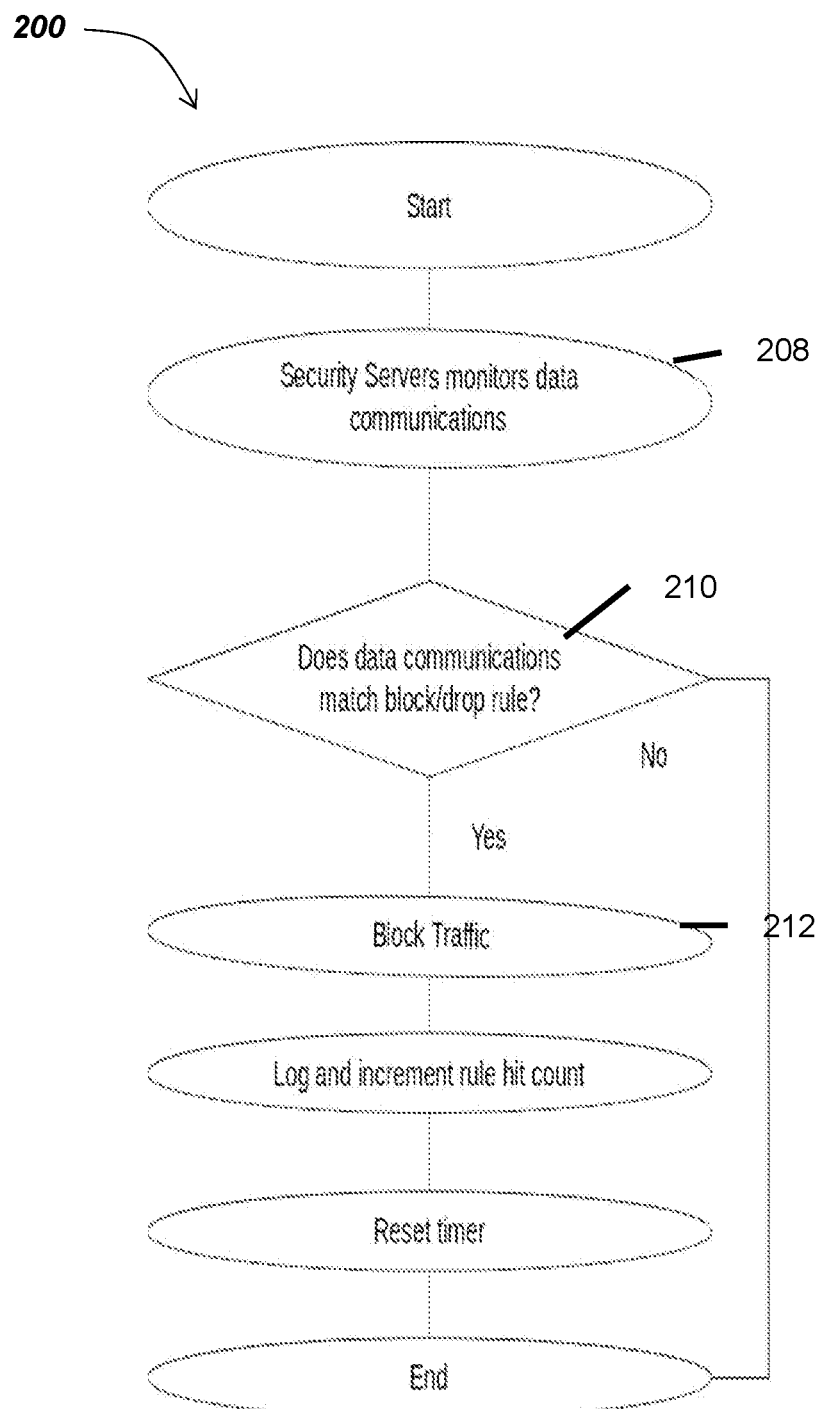
FIG. 2B is a flowchart depicting an embodiment of a method for monitoring data communications by a security server.

FIG. 2B depicts one embodiment of a flowchart for monitoring data communications by the security server 106a. When the security server 106a detects data communications traffic that the security server 106a deems malicious (e.g., by analyzing at least a portion of the data and determining whether a characteristic of the analyzed data is associated with an instruction to block the packet carrying the data), the security server 106a may automatically block the data communications. The security server rule blocking/dropping the data communications may have a timer associated with it. When data communication is blocked by a rule, the timer for that rule resets and the rule hit count increments. The rule hit count is to confirm the rule is actively blocking/dropping traffic. If the rule has not been used once the timer expires, the rule may be removed; this is to ensure that destination addresses are not blocked indefinitely.

In one embodiment, the security server 106a generates a log including an identification of a determination to block the one of the plurality of data packets and transmits the log to an analysis server for analysis to determine whether the blocked packet is part of a plurality of data packets comprising malicious traffic. For example, if the intrusion detection and prevention system 109 detects malicious data communications, the intrusion detection and prevention system 109 may write a log entry. The intrusion detection and prevention system 109 may send the log files to the logging/analytics server in real-time for further inspection.

In some embodiments, the method 200 may include each of the steps in method 300, described in greater detail below.

Although the security server 106a may provide a level of security through the application of security rules by the intrusion detection and prevention system 109 and the real-time and automatic monitoring of network traffic on behalf of the endpoint device 102, the functionality of the security server 106a may be somewhat limited in that the security server 106a will typically only have access to the data addressed to an endpoint device 102 that connected directly to the security server 106a. In an embodiment in which there are a plurality of endpoint devices and endpoint security servers in the network 104a, the security server 106a will not typically have sufficient data to identify threats and attacks across the network 104a. However, the analysis server 106b may have access to security logs from a plurality of security servers 106a and may provide a different level of security, using analysis of that additional data to identify threats and attacks across the network 104a, as described in greater detail in connection with FIG. 3 below.

Figure 3:
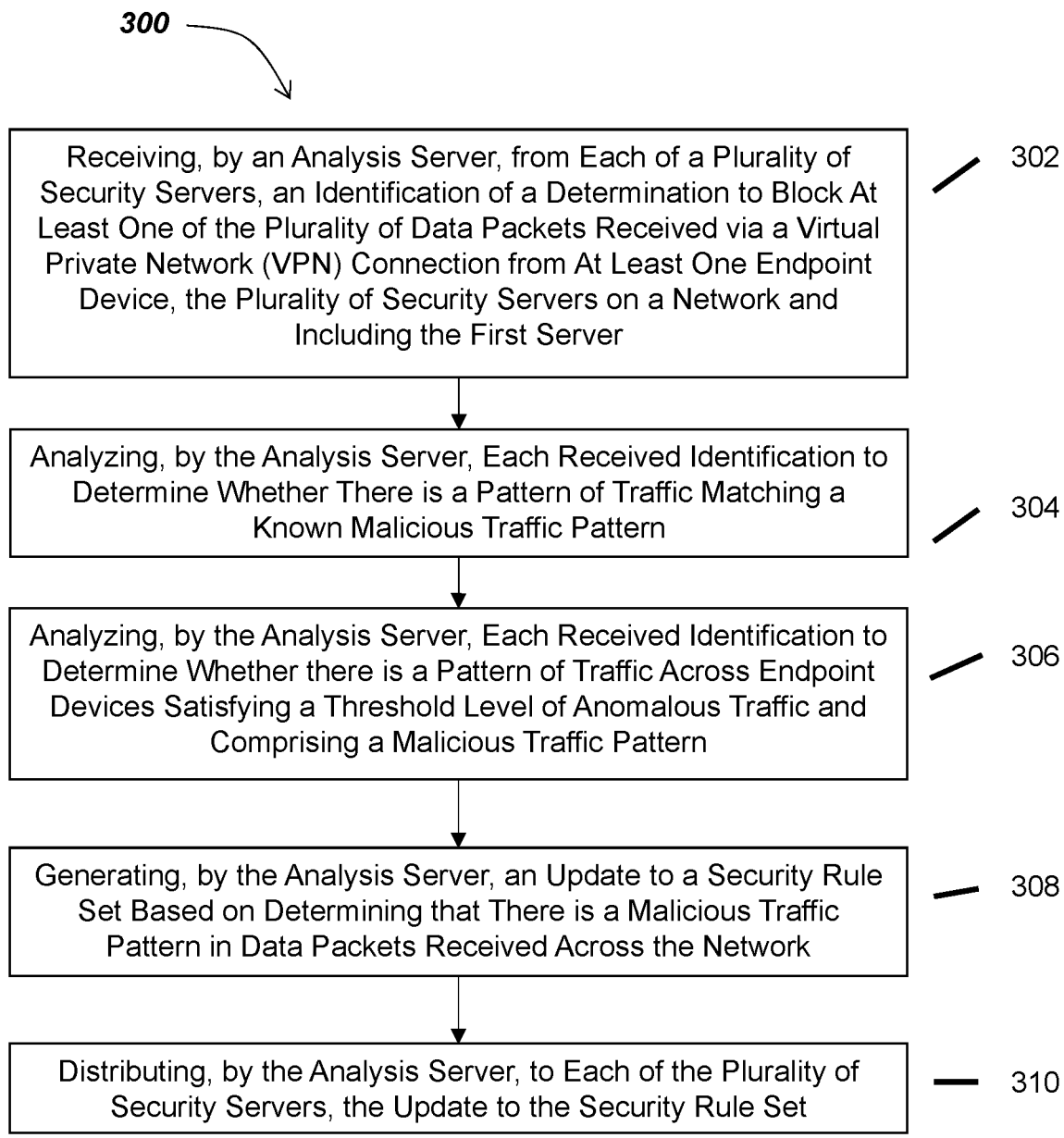
FIG. 3 is a flow diagram depicting an embodiment of a method for automatically securing endpoint device data communications in a network.

Referring now to FIG. 3, a flow diagram depicts one embodiment of a method 300 for automatically securing endpoint device data communications in a network. The method 300 includes receiving, by an analysis server, from each of a plurality of security servers, an identification of a determination to block at least one of the plurality of data packets received via a persistent virtual private network (VPN) connection from at least one endpoint device, the plurality of security servers on a network and including the first server (302). The method 300 includes analyzing, by the analysis server, each received identification to determine whether there is a pattern of traffic matching a known malicious traffic pattern (304). The method 300 includes analyzing, by the analysis server, each received identification to determine whether there is a pattern of traffic across endpoint devices satisfying a threshold level of anomalous traffic and comprising a malicious traffic pattern (306). The method 300 includes generating, by the analysis server, an update to a security rule set based on determining that there is a malicious traffic pattern in data packets received across the network (308). The method 300 includes distributing, by the analysis server, to each of the plurality of security servers, the update to the security rule set (310).

Given the distributed nature of the system, the analysis server 106b may inspect log files from all security servers in a plurality of security servers 106a to provide increased security across a network 104a. The analysis server 106b may continuously analyze the aggregate of the security server logs to detect trends, report metrics, and detect security-related events and anomalies. The analysis server 106b may provide functionality for identifying anomalous traffic patterns even where the traffic patterns do not fall under a particular rule, thus increasing security across the network 104a. Over time, the analysis server 106b may more accurately detect trends, report metrics and detect security-related events. Using automation, the analysis server 106b is able to automatically create security rules based on the logs sent from the security servers. These security rules are loaded into the security server intrusion detection and prevention system 109.

Referring now to FIG. 3, in greater detail and in connection with FIGS. 1, 2A, and 2B, the method 30o includes receiving, by an analysis server, from each of a plurality of security servers, an identification of a determination to block at least one of the plurality of data packets received via a persistent virtual private network (VPN) connection from at least one endpoint device, the plurality of security servers on a network and including the first server (302). The analysis server 106b uses the log files from the security servers to determine if traffic is malicious.

The method 300 includes analyzing, by the analysis server, each received identification to determine whether there is a pattern of traffic matching a known malicious traffic pattern (304). In one embodiment, the analysis server 106b begins by inspecting logs for evidence of distributed denial of service (DDoS) based attacks. In such an embodiment, the data communications first pass through a Distributed Denial of Service Attack Prevention Engine (DDoS APE) 111 of the analysis server 106b; the DDoS APE 111 may mitigate network-related DDoS attacks. In such an embodiment, if the DDoS APE 111 detects malicious behavior, the analysis server 106b writes a rule to block/drop the destination traffic; the analysis server 106b then transmits the rule is to each of the security servers 106a in the network 104a. The analysis server 106b may also inspect logs for evidence of higher-level layer attacks, such as, without limitation, phishing campaigns, bad Uniform Resource Locators (URLs), and Secure Shell (SSH) password attempts. The analysis server 106b, having received logs from multiple security servers 106a, therefore, has access to information about security decisions across machines in the network and has the ability to determine whether there is a pattern of malicious traffic across a network, which the individual security servers 106a do not have the ability to determine since they do not have access to log files from other machines.

The method 300 includes analyzing, by the analysis server, each received identification to determine whether there is a pattern of traffic across endpoint devices satisfying a threshold level of anomalous traffic and comprising a malicious traffic pattern (306). In one embodiment, a malicious traffic patterns prevention engine 113 provides further inspection of security logs; the malicious traffic patterns prevention engine 113 may identify data communications protocol characteristics. More specifically, the malicious traffic patterns prevention engine compares destination port information in the log files to its records of standard behavior for communication protocols. If the inspected destination port information deviates from its standard behavior, a rule is written to block/drop the destination traffic. The rule is then loaded on all security servers.

As an example, if there are ten security servers and a thousand endpoint devices (100 endpoint devices per server), and a known traffic pattern for malicious behavior in a computer network includes having a certain number of communications packets of a particular type during a particular time period (e.g., more than 100 pings per five minute period), a subset of those ten security servers may have received enough packets to satisfy the threshold level needed to indicate malicious behavior but no single one of those might have enough to satisfy the threshold and some security servers would not have received any of the malicious packets at all—each individual server would have insufficient data to detect the pattern but in the aggregate, the analysis server can identify the attack and take action to mitigate or prevent damage.

The method 300 includes generating, by the analysis server, an update to a security rule set based on determining that there is a malicious traffic pattern in data packets received across the network (308). Based on the analysis of the log files, the analysis server may generate a rule to block or drop data communications to destination. The method 300 includes distributing, by the analysis server, to each of the plurality of security servers, the update to the security rule set (310).

Therefore, the security server 106a sends logs in real-time to the analysis server 106b for further inspection. If the analysis server 106b determines the traffic is malicious, the analysis server 106b creates a rule blocking, dropping or throttling data communications to the destination. Then the rule is pushed and loaded to the security server 106a that originally sent the log for analysis and to any other security servers 106a on the network 104a.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure, possibly in combination with other embodiments of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
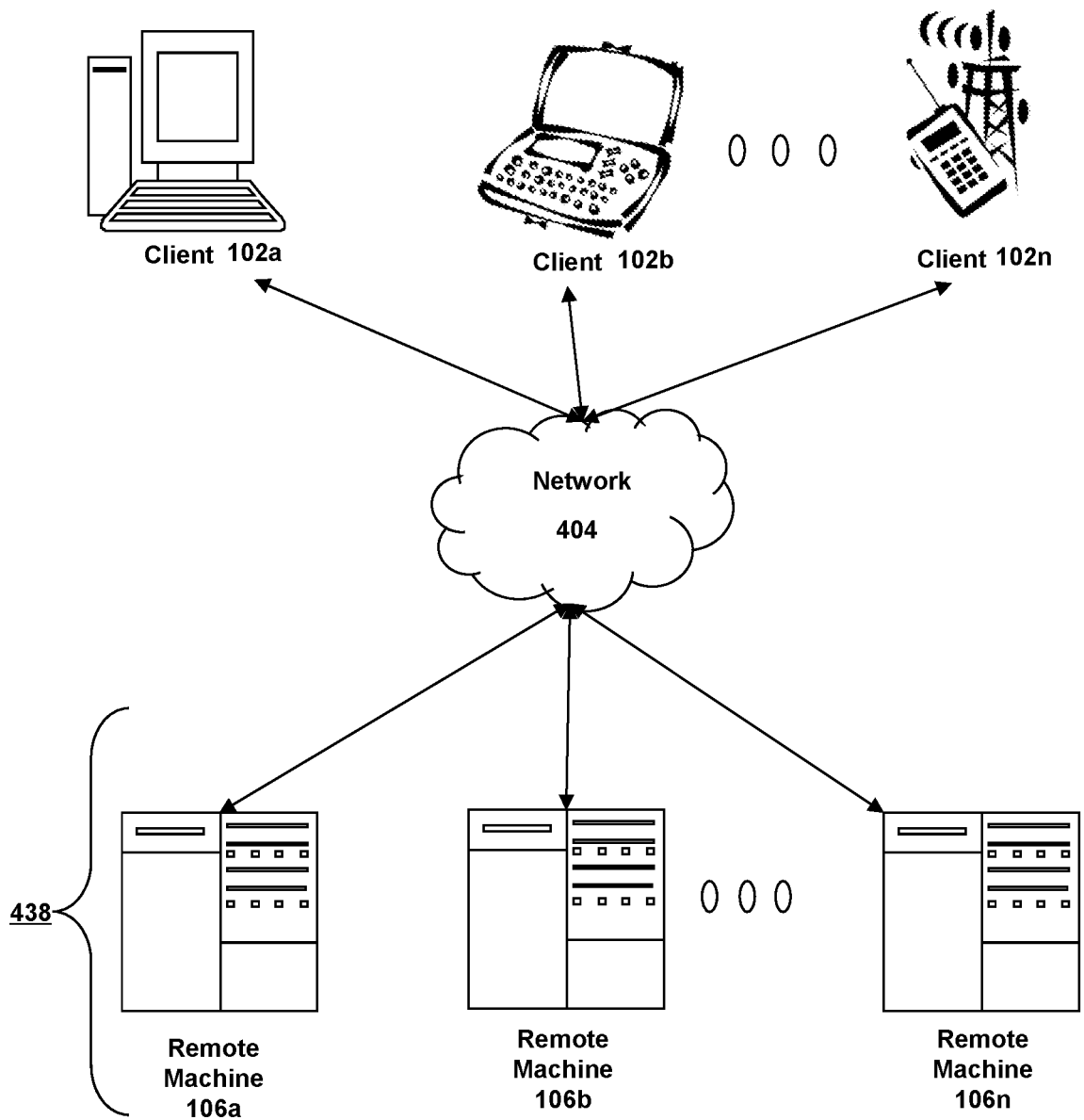
FIGS. 4A, 4B, and 4C are block diagrams depicting embodiments of computers useful in connection with the methods and systems described herein.
Figure 4B:
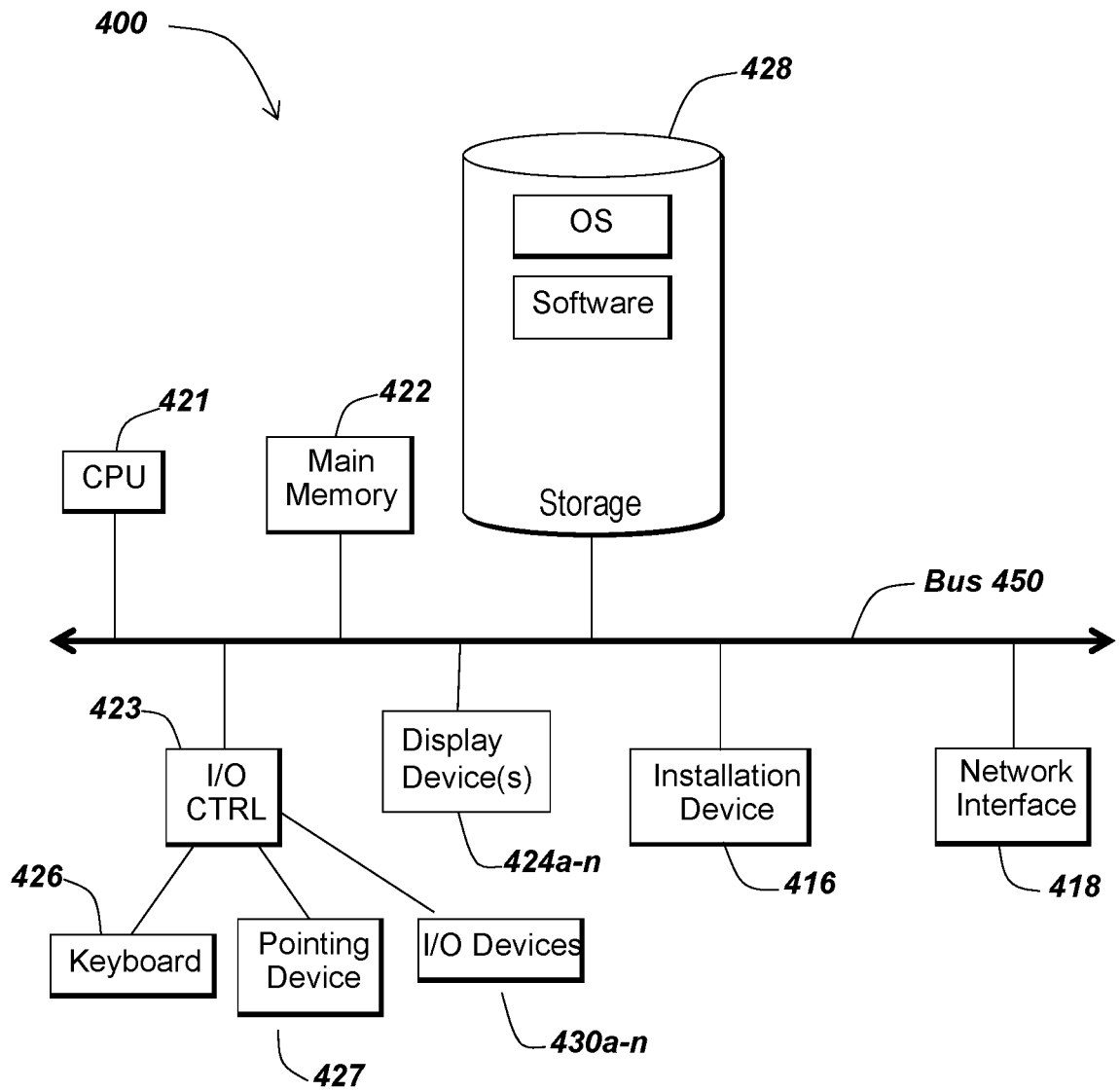
Figure 4C:
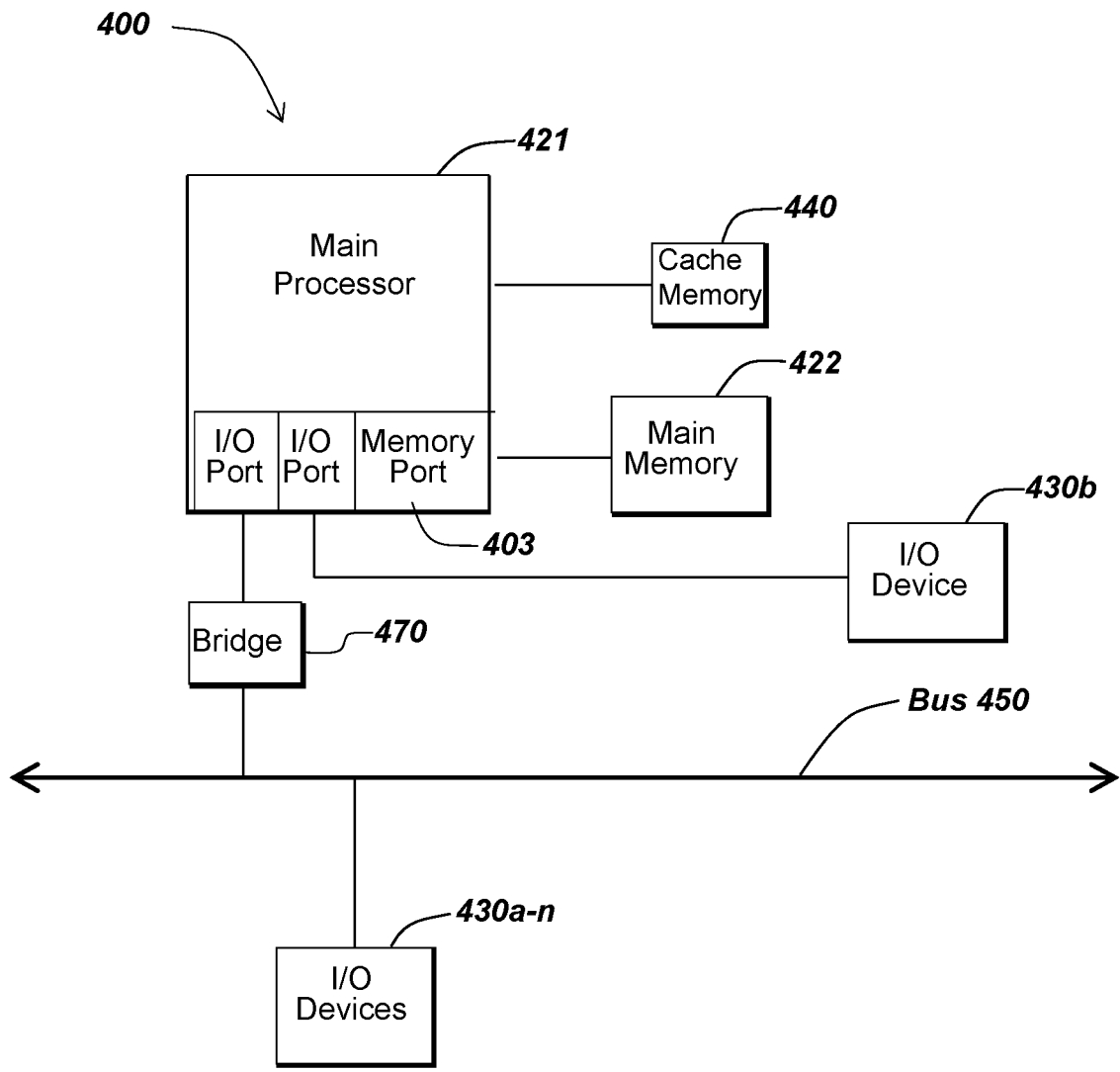

Referring now to FIGS. 4A, 4B, and 4C, block diagrams depict additional detail regarding computing devices that may be modified to execution functionality for implementing the methods and systems described above.

Referring now to FIG. 4A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 404.

Although FIG. 4A shows a network 404 between the client(s) 102 and the remote machines 106, the client(s) 102 and the remote machines 106 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the client(s) and the remote machines 106. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network 404 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client(s) 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client(s) 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client(s) 102.

In one embodiment, a computing device 106 provides functionality of a web server. In some embodiments, a web server 106 comprises an open-source web server, such as the NGINX web servers provided by NGINX, Inc., of San Francisco, CA, or the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the BEA WEBLOGIC products provided by BEA Systems of Santa Clara, CA.

In some embodiments, the system may include multiple, logically-grouped remote machines 106. In one of these embodiments, the logical group of remote machines may be referred to as a server farm 438. In another of these embodiments, the server farm 438 may be administered as a single entity.

FIGS. 4B and 4C depict block diagrams of a computing device 100 useful for practicing an embodiment of the client(s) 102 or a remote machine 106. As shown in FIGS. 4B and 4C, each computing device 100 includes a central processing unit 421, and a main memory unit 422. As shown in FIG. 4B, a computing device 100 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 100 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 321 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 100 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, Ti, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 100' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 430 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.1-4.0, WINDOWS CE, WINDOWS XP, WINDOWS 7, WINDOWS 8, WINDOWS VISTA, and WINDOWS 10, all of which are manufactured by Microsoft Corporation of Redmond, WA; any version of MAC OS manufactured by Apple Inc. of Cupertino, CA; OS/2 manufactured by International Business Machines of Armonk, NY; Red Hat Enterprise Linux, a Linus-variant operating system distributed by Red Hat, Inc., of Raleigh, NC; Ubuntu, a freely-available operating system distributed by Canonical Ltd. of London, England; or any type and/or form of a Unix operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, CA; Google/Motorola Div. of Ft. Worth, TX; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, CA; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, NJ, or Creative Technologies Ltd. of Singapore. In yet other embodiments, the computing device 400 is a portable media player or digital audio player supporting file formats including, but not limited to, MP 3, WAV, M4A/AAC, WMA Protected AAC, AEFF, Audible audiobook, Apple Lossless audio file formats, and .mov, .m4v, and .mp4MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, VA; the FOLIO and THRIVE line of devices manufactured by Toshiba America Information Systems, Inc. of Irvine, CA; the GALAXY line of devices manufactured by Samsung; the HP SLATE line of devices manufactured by Hewlett-Packard; and the STREAK line of devices manufactured by Dell, Inc. of Round Rock, TX.

Having described certain embodiments of methods and systems for automatically securing endpoint device data communications, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for automatically securing endpoint device data communications, the method comprising:
   establishing, between a first server and an endpoint device, a persistent virtual private network (VPN) connection, the endpoint device configured to automatically establish the persistent VPN connection upon establishing network connectivity;
   providing, by the first server, for the endpoint device, a network address translation (NAT) firewall service;
   receiving, by the first server, a first plurality of data packets from a third computing device;
   inspecting, by the first server, each of the first received plurality of data packets;
   determining, by the first server, whether to block one of the first plurality of data packets or to forward the one of the first plurality of data packets to the endpoint device;
   blocking, by the first server, the one of the first plurality of data packets based upon a determination that the one of the first plurality of data packets fails to satisfy a security rule;
   generating, by the first server, a profile of the endpoint device based upon the inspection of each of the received first plurality of data packets;
   applying, by the first server, the profile during an inspection of a second plurality of data packets received from a fourth computing device and addressed to a second endpoint device;
   determining, by the first server, whether to block one of the second plurality of data packets based upon the applying of the profile during the inspection;
   generating, by the first server, a log including an identification of a determination to block the one of the plurality of data packets;

transmitting, by the first server, the log to an analysis server for analysis to determine whether the blocked packet is part of a plurality of data packets comprising malicious traffic;

receiving, by the analysis server, from the first server, the log;

receiving, by the analysis server, from each of a plurality of security servers, a log file including an identification of a determination to block the one of the plurality of data packets, the plurality of security servers on a network and including the first server;

analyzing, by the analysis server, an aggregate of the received log files, to determine whether there is a pattern of traffic matching a known malicious traffic pattern;

analyzing, by the analysis server, the aggregate of the received log files to determine whether there is a pattern of traffic across endpoint devices satisfying a threshold level of anomalous traffic and comprising a malicious traffic pattern;

generating, by the analysis server, an update to a security rule set based on determining that there is a malicious traffic pattern in data packets received across the network; and distributing, by the analysis server, to each of the plurality of security servers, the update to the security rule set.

2. The method of claim 1 further comprising modifying a network connection setting of the endpoint device, the modification requiring a network adapter of the endpoint device to establish the VPN connection to the first server in order to receive network connectivity.

3. The method of claim 1, wherein modifying further comprising modifying a routing table of the endpoint device forcing all network traffic to flow through the VPN connection.

4. The method of claim 1 further comprising modifying a network connection setting of the endpoint device, the modification requiring all network traffic to flow through the VPN connection.

5. The method of claim 2 further comprising modifying a network connection setting of the endpoint device, the modification disabling a second network adapter, the second network adapter configured to transmit network traffic without using the VPN connection.

* * * * *